United States Patent [19]

Ferree et al.

[11] Patent Number: 4,854,945
[45] Date of Patent: Aug. 8, 1989

[54] BLADDER DEVICE AND METHOD FOR DISPLACING AIR IN A BOTTLE BORE SHAFT

[75] Inventors: Herbert E. Ferree, Hempfield Township, Westmoreland County, Pa.; William S. Beal, Winter Springs, Fla.

[73] Assignee: Westinghouse Electric Corp., Pittsburgh, Pa.

[21] Appl. No.: 274,640

[22] Filed: Nov. 17, 1988

Related U.S. Application Data

[63] Continuation of Ser. No. 69,724, Jun. 7, 1987, abandoned.

[51] Int. Cl.$^4$ ............................................... B01D 19/00
[52] U.S. Cl. .......................................... 55/55; 55/189; 417/394
[58] Field of Search ..................... 55/46, 55, 159, 189; 417/394

[56] References Cited

U.S. PATENT DOCUMENTS

| | | | |
|---|---|---|---|
| 901,376 | 10/1908 | Roberts | 128/344 |
| 1,389,635 | 9/1921 | Dunkle | 417/394 |
| 2,570,835 | 10/1951 | Mooney | 55/189 |
| 3,833,013 | 9/1974 | Leonard | 604/122 |
| 4,271,839 | 6/1981 | Fogarty | 128/344 |
| 4,385,909 | 5/1983 | Starr | 55/189 |
| 4,670,029 | 6/1987 | Ferree et al. | 55/189 |
| 4,696,684 | 9/1987 | Shen | 55/189 |
| 4,699,008 | 10/1987 | Ferree et al. | 73/623 |

*Primary Examiner*—Bernard Nozick

[57] ABSTRACT

A trapped air displacement device includes a flexible gas fillable bladder 30 and a device 34 for inserting the blader 30 into a bottle bore 8 of a turbine or generator shaft 14. The flexible bladder 30 displaces the air trapped in the bottle bore region 8, so that it will escape along the slightly tilted surface of the shaft 14. A protective tube 34 is provided for the fragile bladder 30 during positioning. The bladder 30 can be inflated through an inner tube 32. The bladder 30 can also be inflated by sealing a small amount of gas in the bladder 30 and tube 30 and applying a vacuum to the shaft 14.

22 Claims, 4 Drawing Sheets

BLADDER DEVICE AND METHOD FOR DISPLACING AIR IN A BOTTLE BORE SHAFT

This application is a continuation of application Ser. No. 069,724 filed June 7, 1987, now abandoned.

CROSS-REFERENCE TO RELATED APPLICATIONS

This application is related to U.S. Pat. No. 4,699,008 filed Mar. 26, 1986 and U.S. Pat. No. 9,670,029 filed May 12, 1986; U.S. Pat. No. 879,015 filed June 26, 1986; U.S. Pat. No. 878,649 filed June 26, 1986 and U.S. Pat. No. 878,817 filed June 26, 1986 all assigned to Westinghouse.

BACKGROUND OF THE INVENTION

1. Field of the Invention

The present invention is directed to an apparatus for removing air trapped in a bottle bore of a shaft and, more particularly, includes an expandable bladder which displaces the trapped air and allows it travel up the tilted shaft.

2. Description of the Related Art

The present invention is used with an ultrasonic inspection system for inspecting the bore of a turbine or generator rotor shaft. Such an inspection system is described in detail in the above-listed U.S. patents. Such rotors are very large and may be as much as 45 feet in length and several feet in diameter. It is common practice to bore out the center of the shaft to remove flaws in the rotor material. Even after the center of the shaft has been removed, flaws in the steel material near the bore surface may still exist and routine inspections are necessary to determine whether the flaws have expanded due to operating stress and to ensure that the shaft is safe from catastrophic failure.

Immersion type ultrasonic inspection, as practiced in the above-identified U.S. patent applications, requires the use of a liquid such as water as a coupling medium for transmitting ultrasonic pulses from the transducer into the rotor material. Flaws are detected based on reflections of the ultrasonic sound wave from material discontinuities.

A bottle bore shaft is a shaft in which the mid portion has a larger diameter than the end portions. Air can be trapped in the bottle bore portion of the shaft even when the shaft is tilted from a horizontal position. Trapped air reflects and/or diffuses the ultrasonic pulses and the pulse path cannot be reliably determined. Trapped air can prevent the inspection of the portion of the shaft where the air is trapped. For a complete inspection the air must be removed from the shaft.

One method which removes most of the air is described in U.S. Pat. No. 4,670,029 and involves the application of a vacuum to the water filled shaft. Because a perfect vacuum cannot be achieved in the presence of water, about a tenth of the air initially trapped in the bottle bore will remain to form a much smaller air pocket producing a bubble which blocks inspection. FIG. 1 illustrates how a bottle bore 8 can trap air 10 in a water filled 12 shaft 14 even when the shaft 14 is tilted and a vacuum dearation system is used to remove as much air as possible. The water is held in the shaft 14 by an end cap 15.

Another method uses a long small diameter flexible tube at the end of a sensing head to suck the trapped air from the bottle bore. The tube must be attached to a manipulator normally used to position a transducer. This system depends on precise positioning of the tube at the highest point of the surface predicted to harbor the bubble and, since a person cannot actually observe that all the air has been removed, this method does not assure complete removal.

Another much less expensive method uses a flexible vinyl (TYGON) tube attached to the end of a plumbers snake. A small plastic float is attached to the end of a short length of the tube which extends beyond the snake. The snake inserts the tube into the bottle bore where the float lifts the tube into the air pocket where the air is removed by suction. This device is difficult to control and does not assure complete air removal.

SUMMARY OF THE INVENTION

It is an object of the present invention to remove substantially all air trapped in a bottle bore of a turbine or generator shaft.

It is another object of the present invention to provide a simple low cost trapped air removal system.

It is an additional object of the present invention to provide an air removal system that does not require precise placement of the air removal device.

It is a further object of the present invention to provide an air removal system that provides the user with a high confidence level that all trapped air has been removed.

The present invention includes a compliant air filled bladder and a device for inserting the bladder into the bottle bore region of a large turbine or generator shaft. The flexible bladder floats to the top of the bottle bore and displaces the air trapped in the bottle bore region by conforming to the interior surface of the bottle bore. The bladder forces the air down to a position where it will escape to the upper end of the shaft along the slightly tilted interior surface of the shaft. An outer insertion tube is provided for protecting the rather fragile bladder during insertion. The bladder can be inflated by pumping pressurized gas through an inner tube into the bladder. The bladder can also be inflated by sealing a small amount of air in the bladder and inner tube, and then applying a vacuum to the turbine shaft during a vacuum dearation air removal procedure.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
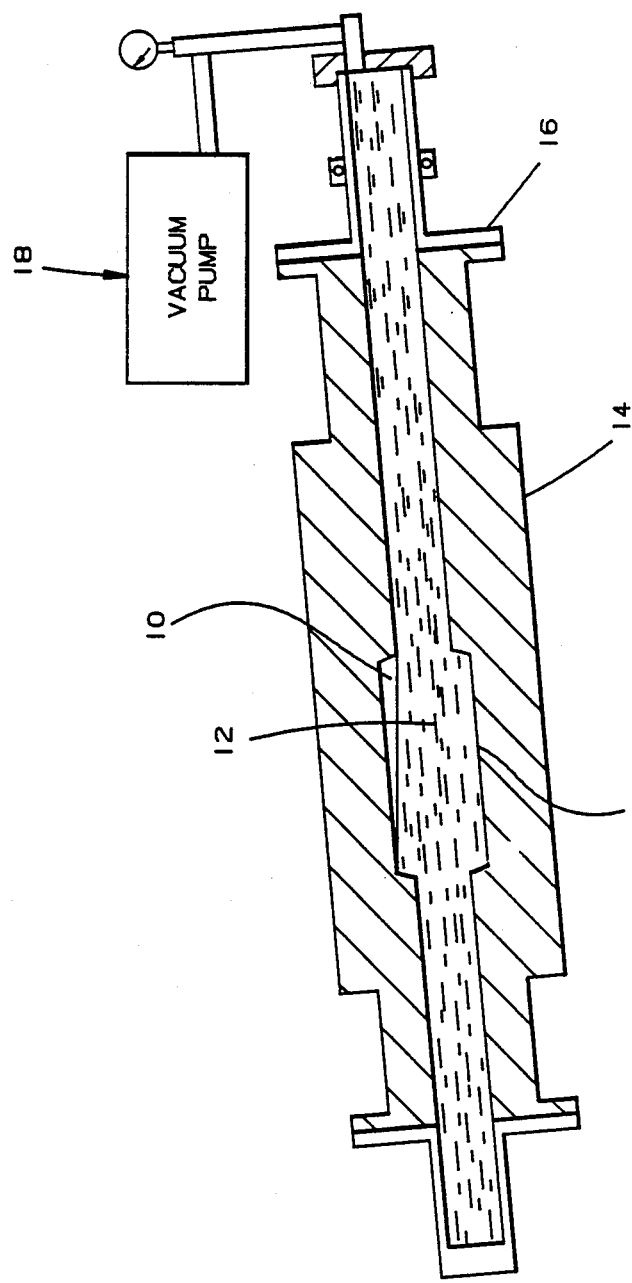
FIG. 1 illustrates how air can be trapped in a rotor shaft 14 even when a vacuum is applied thereto.
Figure 2:
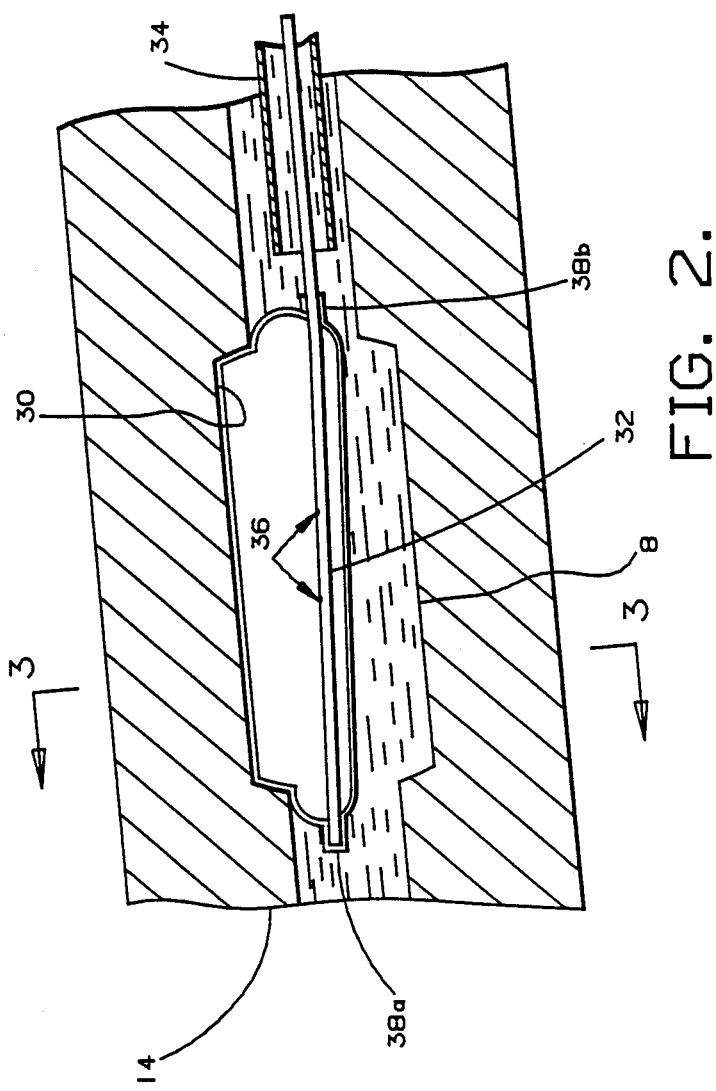
FIGS. 2 and 3 illustrate how a compliant bladder 30 will displace air trapped in a bottle bore 8.
Figure 3:
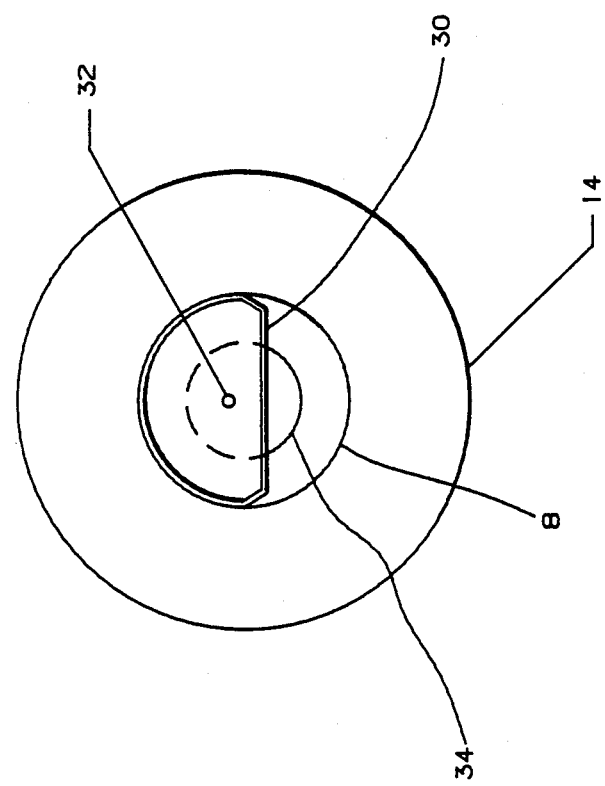

The present invention, as depicted in FIGS. 2 and 3, is an inflatible, compliant bladder 30 attached to a small tube 32 which is used to inflate the bladder 30 while in the bottle bore 8. The bladder 30 is a very compliant substance, such as for example, latex rubber, silicone rubber, polyvinyl or polyethylene film, which will allow the bladder to substantially conform to the interior shape of the bottle bore 8 so that substantially all the air trapped in the bottle bore will be displaced downward under the edge of the bottle bore 8 which along with the angled shaft forms the exit for the displaced gas. The small inner tube 32 is made of plastic such as polyethylene or polyvinyl. This tube 32 must be sufficiently stiff to be able to push the bladder 30 out of the larger outer tube 34 and to also retract the collapsed bladder 30 back into the tube 34, while at the same time being flexible enough to allow the bladder 30 to float to the top of the bottle bore 8. The tube 32 could have a flexible end piece and a rather stiff shaft to allow this dual function to be performed at low cost.

The larger outer tube 34 acts as a protective cover and a stiffening device for insertion of the bladder 30 and should have a length sufficient to reach the bottle bore portion 8 of the shaft 14. A PVC pipe will provide an acceptable light weight outer tube 34.

The bladder 30 is inflated through tube 32 and holes 36 which are positioned inside bladder 30. The bladder 30 is sealed at both ends 38a and 38b to the tube 32 and the tube 32 is also sealed at the far end 38a. The bladder 30 is used most effectively with the vacuum dearation method described in U.S. Pat. No. 4,670,029, and incorporated by reference herein. However, the bladder 30 produces adequate air displacement in the bottle bore 8 when used at atmospheric pressure. It is also possible to inflate the bladder 30 with a light gas such as helium.

Figure 4:
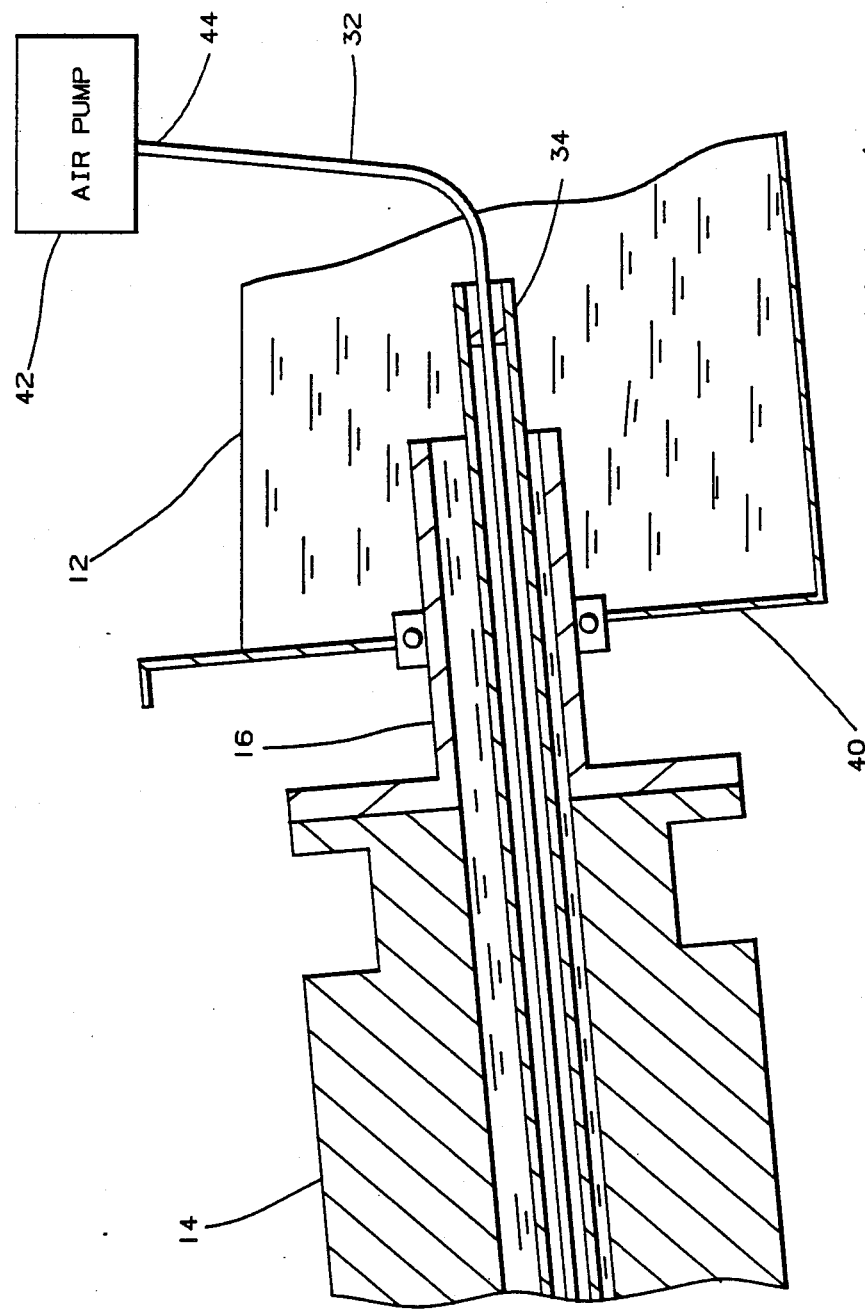
FIG. 4 illustrates one method of coupling the bladder 30 to an air pump 42.

When used with the preferred vacuum dearation method, the bladder 30 is inserted in a collapsed condition into the shaft 14 through an adapter 16 which is completely underwater in a water filled tank 40 as illustrated in FIG. 4. The bladder 30 is positioned in the protective tube 34 in a collapsed condition. When the tube 34 has the bladder 30 in the appropriate position the protective tube 34 is retracted to expose the full length of the bladder 30 and a sufficient portion of tube 32 to allow the bladder 30 to float freely when expanded. To properly position the tube 34 in the shaft 14, the tube 34 should be marked with distance measuring graduations so that insertion to the proper position is possible. Once the bladder 30 is in position, a pump 42 can be used to inflate the bladder 30. It is also possible to seal the inner tube 32 at the outer end 44. If the tube 32 is sealed at the outer end 44, it should contain sufficient air to inflate the bladder to an absolute pressure of about 5 inches of mercury when the external pressure in the bore is reduced to about 3 inches of mercury. Since the water 12 filling the bore is at low pressure the inflated bladder 30 will float and displace the air at the top of the bottle bore 8 to cause the air outside the bladder 30 to migrate down to the main level of the bore where it can escape up the tilted shaft 14 and be evacuated from the upper end and out the outlet 15.

It is also possible to position the bladder 30 at the farthest end of the shaft 14 adjacent the end cap 15 and slowly pull it out allowing it to float along the upper surface of the shaft bore. This method is not preferred because it complicates the sealing problem when a vacuum is applied to the shaft 14 but may be adequate without applying a vacuum to the shaft 14.

Since the bladder 30 is made from a very elastic and compliant material it will displace substantially all of the air. If the vacuum dearation method is used, when the bore 8 is returned to atmospheric pressure any very small bubbles which remain will contract to 1/10th of their initial size so that the few tiny remaining bubbles will not adversely affect any ultrasonic inspection. In the vacuum dearation method, as the bore 8 returns to atmospheric pressure and if the sealed end type tube 32 is used, the bladder 30 will contract to its fully collapsed condition so that protective tube 34 can be extended over the bladder 30 and withdrawn without causing damage.

If additional air needs to be removed from the bottle bore 8 the sealed end of the tube 32 can be exposed to atmospheric pressure and the bouyancy of the bladder 30 will be substantially increased thereby further displacing trapped air. It is also possible to produce a positive gas pressure in the bladder 30 by using a pump 42. However, in this method the pressure applied to the bladder 30 should not be excessive since the bladder 30 would rupture. In this method it is also better not to fully inflate the bladder so that it will be more compliant.

If the sealed tube method is used, the amount of air required inside the tube 32 and the bladder 30 can be calculated and permanently sealed therein, since the volume of air required can be determined by the approximate ratio of the pressures and the final required volume is approximately constant. If the air pump method is used an absolute pressure of about 5 inches of mercury in the bladder 30 would be appropriate.

When the present invention is used at atmospheric pressure it should be used after vacuum dearation because it is best to evacuate the bore and remove all air dissolved in the water so that when the invention is inserted and used to remove the trapped air, additional dissolved air will not later rise to the top of the bottle bore 8. In this method the inner tube 32 must be inflated at a pressure of about 3 inches of mercury above atmospheric pressure to displace the air in the bottle bore 8.

It is also possible to inflate the bladder 30 so that it completely fills the shaft at the location of the bottle bore 8. This approach is not recommended because it could prevent the air from migrating up the bore to escape. In addition the bladder 30 thickness would have to be so great that it may not fully conform to the shape of the bottle bore 8, thus allowing trapped air to remain.

The many features and advantages of the present invention are apparent from the detailed specification and thus it is intended by the appended claims to cover all such features and advantages of the invention which fall within the true spirit and scope thereof. Furthermore, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for removing trapped gas, comprising:
   a liquid filled compartment having a trapped gas space and an exit through which trapped gas can pass;
   floating displacement means for displacing the trapped gas out of the trapped gas space, toward and out the exit; and
   insertion means for inserting said displacement means in the compartment.

2. An apparatus as recited in claim 1, wherein said insertion means includes a passage for pressurized gas and said displacement means comprises a compliant bladder fillable with the pressurized gas.

3. An apparatus as recited in claim 2, wherein said insertion means comprises:
   a pressurizable gas tube coupled to said bladder; and
   a protective tube into which said bladder is retracted by said gas tube when said protective tube is inserted and removed from the compartment.

4. An apparatus as recited in claim 1, wherein said insertion means comprises a rod and said displacement means comprises a sealed compliant bladder attached to said rod and containing an expandable gas, the expandable gas expanding said bladder when the compartment has a vacuum applied thereto.

5. An apparatus as recited in claim 4, wherein said insertion means further comprises a protective tube into which said bladder is retracted by said rod when said protective tube is inserted and removed from the compartment.

6. An apparatus for removing trapped air, comprising:
   an angled shaft filled with water and having a bottle bore forming a trapped gas space;
   a plastic tube having gas holes in a first end;
   a floating compliant bladder sealed around the holes of the first end of said plastic tube, said compliant bladder expanding and displacing the air trapped in the trapped gas space of the bottle bore allowing the air to travel up and out the angled shaft; and
   a plastic pipe through which said plastic tube passes and having a diameter sufficient to allow entry of said compliant bladder when said compliant bladder is collapsed.

7. An apparatus as recited in claim 6, wherein said plastic tube has sealed a second end.

8. An apparatus as recited in claim 6, wherein said plastic tube has a second end and said apparatus further comprises a gas pump coupled to the second end.

9. An apparatus as recited in claim 6, further comprising a vacuum pump coupled to the shaft and applying a vacuum to the shaft.

10. An apparatus as recited in claim 9, wherein said plastic tube has a second end open and exposed to atmospheric pressure.

11. A method of removing gas trapped in a liquid filled compartment having a trapped gas space and an exit below the trapped gas, said method comprising the steps of:
   (a) inserting a collapsed flexible bladder residing in a tube into the compartment, the flexible bladder including an amount of gas that does not alter the collapsed state during insertion;
   (b) removing the bladder from the tube;
   (c) applying a vacuum to the compartment, causing the bladder to expand, floating to the top of the compartment and displacing the trapped gas out of the trapped gas space, toward and out the exit.

12. A method as recited in claim 11, further comprising the steps of:
   (d) removing the vacuum causing the bladder to collapse;
   (e) retracting the bladder into the tube; and
   (f) removing the tube from the compartment.

13. A method of removing gas trapped in a liquid filled compartment having a trapped gas space and an exit below the trapped gas, said method comprising the steps of:
   (a) inserting a collapsed flexible bladder into the compartment; and
   (b) inflating the bladder, causing the bladder to float to the top of the compartment and displacing the trapped gas out of the trapped gas space, toward and out the exit.

14. A method as recited in claim 13, wherein the bladder is partially inflated.

15. A method as recited in claim 13, further comprising the steps of:
   (c) deflating the bladder; and
   (d) removing the collapsed bladder from the compartment.

16. A method as recited in claim 15, wherein the bladder is partially inflated.

17. A method of removing gas trapped in a liquid filled compartment having a trapped gas space and an exit below the trapped gas, said method comprising the steps of:
   (a) inserting a collapsed flexible bladder residing in a holding tube into the compartment;
   (b) removing the bladder from the holding tube; and
   (c) inflating the bladder, causing the bladder to float to the top of the compartment and displacing the trapped gas out of the trapped gas space toward and out the exit.

18. A method as recited in claim 16, wherein said bladder is attached to an inflation tube and step (b) comprises forcing the bladder out of the holding tube using the inflation tube for a distance that allows the bladder to float.

19. A method as recited in claim 18, further comprising:
   (d) deflating the bladder using the inflation tube;
   (e) retracting the bladder into the holding tube using the inflation tube; and
   (f) removing the holding tube.

20. A method of removing gas trapped in a liquid filled compartment having a trapped gas space, an exit below the trapped gas, an end away from the trapped gas and a top, said method comprising the steps of:
   (a) inserting a collapsed bladder into the compartment to the end of the compartment;
   (b) inflating the bladder causing the bladder to float to the top of the compartment; and
   (c) retracting the bladder along the top of the compartment displacing the trapped gas out of the trapped gas space, toward and out the exit.

21. A method as recited in claim 20, wherein step (a) comprises:
   (a1) inserting the collapsed bladder residing in a holding tube into the compartment; and
   (a2) forcing the collapsed bladder from the holding tube using an inflation tube attached to the bladder, and
   step (c) comprises retracting the bladder by refracting both the holding tube and inflation tube.

22. A method as recited in claim 20, wherein the bladder is partially inflated.

* * * * *